(12) United States Patent
Xu

(10) Patent No.: US 12,342,078 B2
(45) Date of Patent: Jun. 24, 2025

(54) PHOTOGRAPHING APPARATUS, ELECTRONIC DEVICE, AND CONTROL METHOD

(71) Applicant: VIVO MOBILE COMMUNICATION CO., LTD., Guangdong (CN)

(72) Inventor: Nenghua Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 248 days.

(21) Appl. No.: 17/992,984

(22) Filed: Nov. 23, 2022

(65) Prior Publication Data

US 2023/0077936 A1 Mar. 16, 2023

Related U.S. Application Data

(63) Continuation of application No. PCT/CN2021/095014, filed on May 21, 2021.

(30) Foreign Application Priority Data

May 25, 2020 (CN) .......................... 202010448464.4

(51) Int. Cl.
*H04N 23/68* (2023.01)
*H04N 23/54* (2023.01)
*H04N 23/55* (2023.01)

(52) U.S. Cl.
CPC .......... *H04N 23/687* (2023.01); *H04N 23/54* (2023.01); *H04N 23/55* (2023.01)

(58) Field of Classification Search
CPC ...... H04N 23/687; H04N 23/54; H04N 23/55; H04N 23/57; H04N 23/68; H04N 23/682;
(Continued)

(56) References Cited

U.S. PATENT DOCUMENTS 11,624,893 B2 * 4/2023 Kuo ................. H04N 23/55
359/823
2006/0017815 A1 1/2006 Stavely et al.
(Continued)

FOREIGN PATENT DOCUMENTS

CN 103033947 A 4/2013
CN 106684107 A 5/2017
(Continued)

*Primary Examiner* — Nhan T Tran
(74) *Attorney, Agent, or Firm* — Price Heneveld LLP

(57) ABSTRACT

A photographing apparatus, an electronic device, and a control method are provided. The photographing apparatus includes: a base; a lens module, where the lens module is mounted on the base, the lens module is fixedly arranged relative to the base, and the lens module includes a lens body; a photosensitive chip module, where the photosensitive chip module is mounted on the lens module, the photosensitive chip module is located on a side of the lens module that is close to the base, the photosensitive chip module is movable within a first plane, and the first plane is a plane parallel to the lens body; and a driving module, where the driving module is separately connected to the lens module and the photosensitive chip module, and the driving module drives the photosensitive chip module to move within the first plane.

18 Claims, 11 Drawing Sheets

(58) Field of Classification Search
CPC ...... H04N 23/685; H04N 23/50; H04N 23/67;
G03B 2205/0015; G03B 2205/0084;
G03B 5/00; G03B 30/00
See application file for complete search history.

(56) References Cited

U.S. PATENT DOCUMENTS

| | | |
|---|---|---|
| 2007/0182824 A1 | 8/2007 | Nomura et al. |
| 2013/0088609 A1* | 4/2013 | Shimizu ............... H04N 23/687 |
| | | 359/554 |
| 2016/0154250 A1 | 6/2016 | Miller |
| 2019/0141248 A1 | 5/2019 | Hubert et al. |
| 2020/0099317 A1* | 3/2020 | Wang ................... G02B 27/646 |
| 2022/0201167 A1 | 6/2022 | Chen |

FOREIGN PATENT DOCUMENTS

| | | | |
|---|---|---|---|
| CN | 106791289 A | 5/2017 | |
| CN | 109061979 A | 12/2018 | |
| CN | 109348105 A | 2/2019 | |
| CN | 208506454 U | 2/2019 | |
| CN | 109819152 A | 5/2019 | |
| CN | 208940074 U | 6/2019 | |
| CN | 209299370 U | 8/2019 | |
| CN | 209402560 U | 9/2019 | |
| CN | 209787281 U * | 12/2019 | ............. H04N 5/225 |
| CN | 110730285 A | 1/2020 | |
| CN | 110839120 A | 2/2020 | |
| CN | 111556239 A | 8/2020 | |
| JP | 2017207734 A | 11/2017 | |
| JP | 2017538162 A | 12/2017 | |
| JP | 2020170170 A | 10/2020 | |
| KR | 20140025635 A | 3/2014 | |
| WO | 2018112436 A1 | 6/2018 | |

* cited by examiner

PHOTOGRAPHING APPARATUS, ELECTRONIC DEVICE, AND CONTROL METHOD

CROSS-REFERENCE TO RELATED APPLICATIONS

This application is a continuation application of International Application No. PCT/CN2021/095014 filed on May 21, 2021, which claims priority to Chinese Patent Application No. 202010448464.4 filed in China on May 25, 2020, which are incorporated herein by reference in their entireties.

TECHNICAL FIELD

Embodiments of the present application relate to the field of communications technologies, and in particular, to a photographing apparatus, an electronic device, and a control method.

BACKGROUND

In a case of taking a picture with an electronic device, the shaking of the hand may cause a slight tilt of the camera, and the tilt may cause a change in the viewing angle of the camera lens, so that the captured image may be in an unstable state as the shaking of the hand. In the related art, the chip of the photographing apparatus is usually fixed, and the purpose of anti-shake is achieved by moving the lens. However, when the lens is relatively heavy, it is difficult to move the lens for anti-shake.

SUMMARY

Embodiments of the present application provide a photographing apparatus, an electronic device, and a control method.

According to a first aspect, an embodiment of the present application provides a photographing apparatus, and the apparatus includes:

a base;

a lens module, where the lens module is mounted on the base, the lens module is fixedly arranged relative to the base, and the lens module includes a lens body;

a photosensitive chip module, where the photosensitive chip module is mounted on the lens module, the photosensitive chip module is located on a side of the lens module that is close to the base, the photosensitive chip module is movable within a first plane, and the first plane is a plane parallel to the lens body; and a driving module, where the driving module is separately connected to the lens module and the photosensitive chip module, and the driving module drives the photosensitive chip module to move within the first plane.

According to a second aspect, an embodiment of the present application provides an electronic device, including the photographing apparatus described in the first aspect.

According to a third aspect, an embodiment of the present application provides a method for controlling a photographing apparatus, including:

receiving an input of a user; and driving, by the driving module in response to the input, the photosensitive chip module to move within the first plane for anti-shake.

Figure 1:
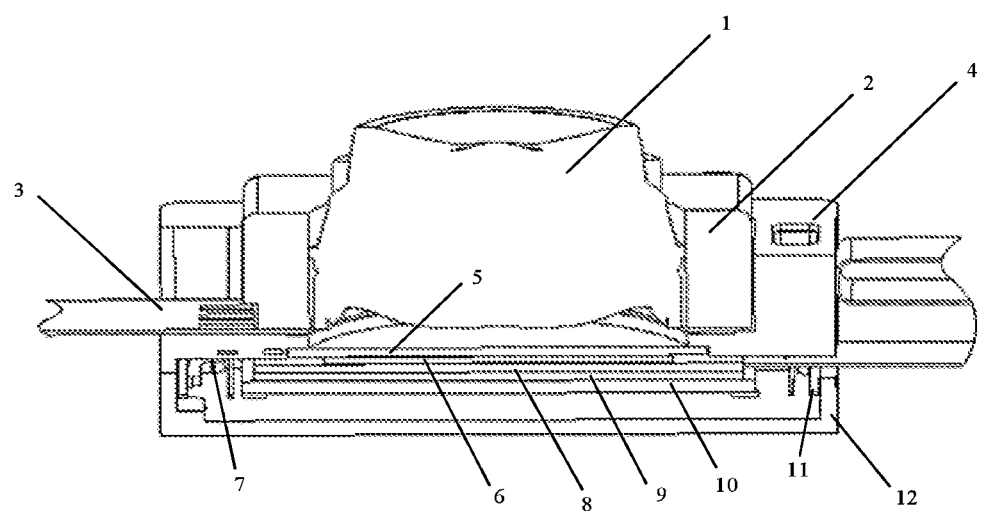
FIG. 1 is a schematic sectional view of a photographing apparatus according to an embodiment of the present application.
Figure 2:
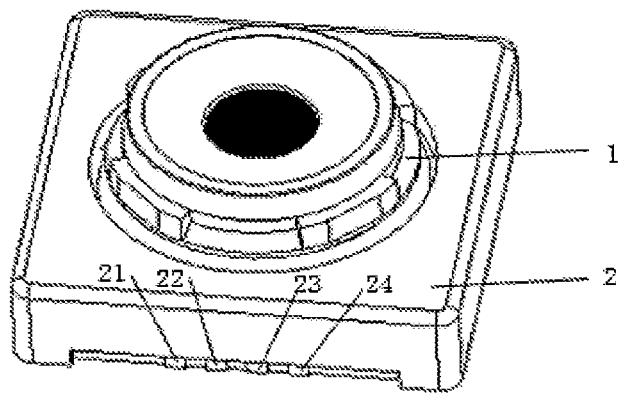
FIG. 2 to FIG. 25 are schematic diagrams of partial structures of a photographing apparatus according to embodiments of the present application.
Figure 3:
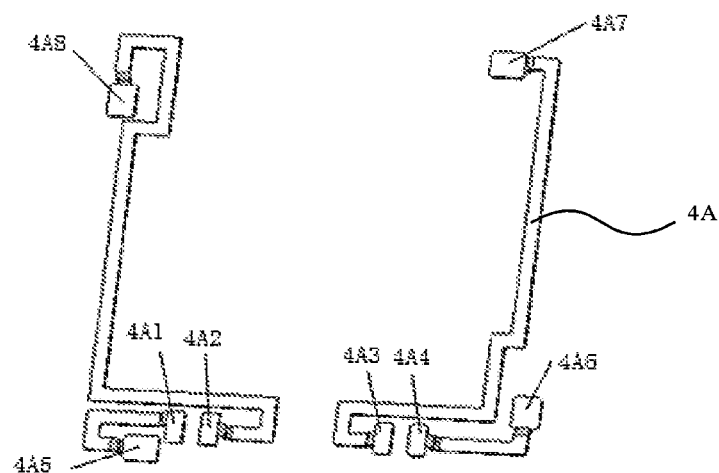
Figure 4:
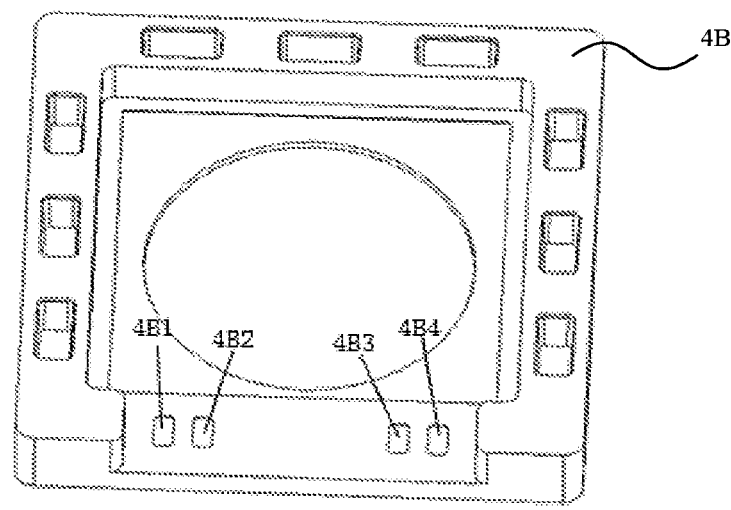
Figure 5:
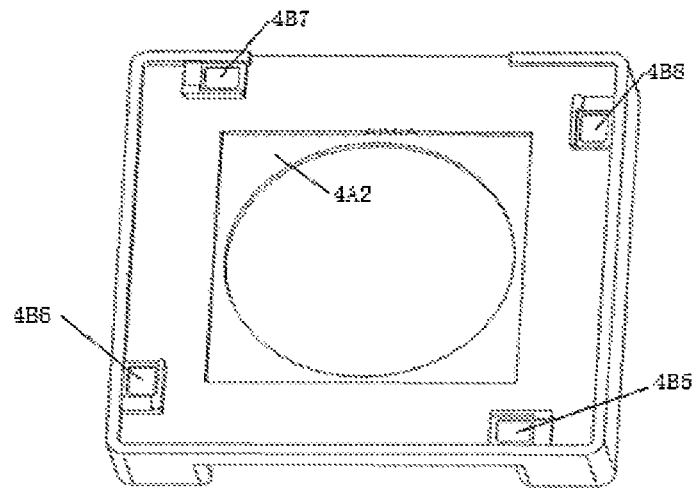

Reference numerals in the accompanying drawings are as follows:

1—lens body, 2—motor, 3—focusing substrate, 4—frame;

5—filter, 6—photosensitive chip;

7—electro-deformation assembly, 731/733—first deformation member, 732/734—second deformation member, 8—first substrate, 9—module steel plate, 10—bracket;

11—elastic member; B16—first fixing portion, B17—second fixing portion, B15—elastic connecting arm; and 12—base, C4—baseboard, 47—side wall.

DESCRIPTION OF EMBODIMENTS

To make objectives, technical solutions, and advantages of the present application clearer, the technical solutions in the embodiments of this application will be clearly described below in combination with the accompanying drawings in the embodiments of this application. Obviously, the described embodiments are a part of the embodiments of this application, rather than all of the embodiments. All other embodiments obtained by a person of ordinary skill in the art based on the embodiments of the present application without creative efforts shall fall within the protection scope of the present application.

The following specifically describes the photographing apparatus provided in the embodiments of this application through specific embodiments and application scenarios thereof with reference to the accompanying drawings.

Referring to FIG. 1 to FIG. 26, an embodiment of the present application discloses a photographing apparatus. The photographing apparatus includes: a base 12, a lens module, a photosensitive chip module, and a driving module.

The base 12 is a basic component of the photographing apparatus, and can provide a mounting basis for other components of the photographing apparatus.

Optionally, the base 12 is an injection-molded plastic part.

The lens module is mounted on the base 12, the lens module is fixedly arranged relative to the base 12. The lens module includes a lens body 1, and the lens body 1 is used to transmit light.

The photosensitive chip module is mounted on the lens module, the photosensitive chip module is located on a side of the lens module that is close to the base 12, the photosensitive chip module is movable within a first plane, and the first plane is a plane parallel to the lens body 1. The photosensitive chip module receives the light transmitted by the lens body 1 and converts an optical signal into an electrical signal. When the photosensitive chip module moves, the shake can be compensated, so that an image of the photographed object becomes clear, that is, anti-shake is realized.

It can be understood that the first plane is a plane parallel to the lens body 1, that is, the first plane is a plane perpendicular to a primary optical axis of the lens body 1. The primary optical axis refers to a straight line that is perpendicular to the lens body 1 through an optical center. It can be understood that a point located in the center of the lens body 1 is referred to as the optical center.

The driving module is separately connected to the lens module and the photosensitive chip module, and the driving module drives the photosensitive chip module to move within the first plane. In other words, the driving module provides power for the photosensitive chip module, so that the photosensitive chip module moves in a plane parallel to the lens body 1, so as to compensate for the shake, that is, the driving module drives the photosensitive chip module to achieve anti-shake.

It can be understood that the lens module is fixedly arranged relative to the base 12, and the driving module drives the photosensitive chip module to move, so as to achieve anti-shake. There is no relative displacement of the lens module, and therefore, compared with the solution that the lens module moves in the related art, in the anti-shake method of this solution, only the photosensitive chip module need to move, and the lens module does not need to move, so that the anti-shake can be easily achieved regardless of the weight of the lens module. In addition, the lens module is fixedly arranged, which improves the reliability of the photographing apparatus.

According to some embodiments of the present application, the photosensitive chip module includes a first substrate 8 and a photosensitive chip 6. The photosensitive chip 6 is mounted on the first substrate 8, the photosensitive chip 6 faces the lens body 1, and the photosensitive chip 6 is electrically connected to the first substrate 8, where the driving module is connected to the first substrate 8, the driving module is electrically connected to the first substrate 8, and the driving module drives the first substrate 8 to move within the first plane to drive the photosensitive chip 6 to move.

Optionally, the first substrate 8 may be a printed circuit board, which provides electrical connection relationships for other components, and the first substrate 8 may be any one of a single-sided board, a double-sided board, and a multi-layer printed circuit board. This is not limited in this embodiment of the present application.

Therefore, the first substrate 8 may fix the photosensitive chip 6, and may provide an electrical connection relationship for the photosensitive chip 6. The first substrate 8 may also provide an electrical connection relationship for the driving module. The driving module is connected to the first substrate 8, the driving module drives the first substrate 8 to move, and the first substrate 8 drives the photosensitive chip 6 to move within the first plane, thereby realizing anti-shake. The photosensitive chip 6 faces the lens body 1. The photosensitive chip 6 receives the light transmitted by the lens body 1 and converts an optical signal into an electrical signal. The electrical signal is transmitted to the first substrate 8, and imaging can be achieved with other image processing devices.

When the driving module drives the first substrate 8 to drive the photosensitive chip 6 to move within the first plane, a moving direction of the photosensitive chip 6 within the first plane may be opposite to a direction of shaking, so that the shake can be compensated, and an image of the photographed object becomes clear, that is, anti-shake is realized.

According to some embodiments of the present application, the driving module includes an electro-deformation assembly 7, where the electro-deformation assembly 7 is separately connected to the lens module and the first substrate 8, the electro-deformation assembly 7 is electrically connected to the first substrate 8, and in a case that the electro-deformation assembly 7 is energized, the electro-deformable assembly 7 can be deformed to drive the first substrate 8 to move within the first plane, and the first substrate 8 drives the photosensitive chip 6 to move.

Alternatively, the electro-deformation assembly 7 may be a shape memory alloy assembly.

In this embodiment of the present application, the electro-deformation assembly 7 is used as a driving force to drive the photosensitive chip module to move inward within the first plane. Because the driving force generated by the electro-deformation assembly 7 is relatively large, which is usually more than 5 times the magneto-electric driving force under the same size, and the electro-deformation assembly 7 has no magnetic interference, and there is no magnet in the entire photographing apparatus, there is no need to consider the magnetic interference problem in the assembly of the entire machine, and the multi-camera module may also have an advantage in size.

In addition, a size and direction of electrification in the electro-deformation assembly 7 may be used to control the length and direction of the electro-deformation assembly 7, so that a moving distance and direction of the photosensitive chip 6 within the first plane may be controlled for flexible anti-shake.

According to some embodiments of the present application, the driving module further includes a bracket 10, where the bracket 10 is separately connected to the first substrate 8 and the electro-deformation assembly 7, and the electro-deformation assembly 7 is electrically connected to the first substrate 8 through the bracket 10.

The bracket 10 may support the first substrate 8. In addition, when the photographing apparatus encounters a collision, the bracket 10 is firstly impacted to protect the photosensitive chip 6 and improve the reliability of the photographing apparatus; and the bracket 10 is separately connected to the driving module and the first substrate 8, so that the driving module and the first substrate 8 are connected for conduction.

For example, as shown in FIG. 14, FIG. 15, FIG. 16, and FIG. 17, the bracket 10 includes a conductive part 10AB and an injection molded part 10AA, and the conductive part 10AB and the injection molded part 10AA are insert-molded by using the insert molding technology. The conductive part 10AB includes a metal surface AB1, a metal surface AB2, a metal surface AB3, a metal surface AB4, a metal surface AB5, a metal surface AB6, a metal surface AB7, and a metal surface AB8, and the injection molded part 10AA includes a groove AA1, a groove AA2, a groove AA3, a groove AA4, a groove AA5, a groove AA6, a groove AA7, and a groove AA8. The metal surface AB1 and the groove AA1 form a welding area A11, the metal surface AB2 and the groove AA2 form a welding area A12, the metal surface AB3 and the groove AA3 form a welding area A13, the metal surface AB4 and the groove AA4 form a welding area A14, the metal surface AB5 and the groove AA5 form a welding area A21, the metal surface AB6 and the groove AA6 form a welding area A22, the metal surface AB7 and the groove AA7 form a welding area A23, and the metal surface AB8 and the groove AA8 form a welding area A24. In this way, an overall weight of the bracket 10 may be reduced while ensuring the electrical connection relationship of the bracket 10.

In some optional embodiments, the electro-deformation assembly 7 includes a first deformation member, where the first deformation member is separately connected to the first substrate 8 and the lens module, the first deformation member extends along a first direction, and in a case that the first deformation member is energized, the first deformation member can be deformed to drive the first substrate 8 to move in the first direction, and the first substrate 8 drives the photosensitive chip 6 to move.

Alternatively, the first deformation member may be a shape memory alloy member.

The first deformation member is connected to the first substrate 8, and the first substrate 8 may provide an electrical connection relationship for the first deformation member. Optionally, one end of the first deformation member is connected to the first substrate 8, and the other end of the first deformation member is connected to the lens module. Because the lens module is fixedly arranged relative to the base 12, in a case that the first deformation member is energized, the first deformation member is deformed to drive the first substrate 8 to move in the first direction of the first plane. Since the first substrate 8 is connected to the photosensitive chip 6, the photosensitive chip 6 may move in the first direction for anti-shake.

According to some embodiments of the present application, the electro-deformation assembly 7 includes a second deformation member, where the second deformation member is separately connected to the first substrate 8 and the lens module, the second deformation member extends along a second direction, and in a case that the second deformation member is energized, the second deformation member can be deformed to drive the first substrate 8 to move in the second direction, and the first substrate 8 drives the photosensitive chip 6 to move.

Both the second direction and the first direction are within the first plane, and the second direction intersects the first direction.

The principle of the second deformation member is similar to that of the first deformation member described above, and details are not described herein again.

It can be understood that both the second direction and the first direction are in the first plane, and the second direction intersects the first direction, and therefore, the first deformation member and the second deformation member may act together, so that the photosensitive chip 6 may move in any direction of the first plane, that is, in a case of shaking in any direction, the photographing apparatus may compensate for the shake, thereby realizing anti-shake.

In some optional embodiments, there are a plurality of the first deformation members, and the plurality of first deformation members are arranged in parallel and spaced apart from each other; and there are a plurality of the second deformation members, and the plurality of second deformation members are arranged in parallel and spaced apart from each other.

It can be understood that "the plurality of" may refer to two or more. There are a plurality of first deformation members which are arranged in parallel and spaced apart from each other, so as to provide a stronger and more stable driving force in the first direction. Similarly, there are a plurality of second deformation members which are arranged in parallel and spaced apart from each other, so as to provide a stronger and more stable driving force in the second direction. Further, it is easier to drive the photosensitive chip 6 to move, so that the stability is improved.

Figure 18:
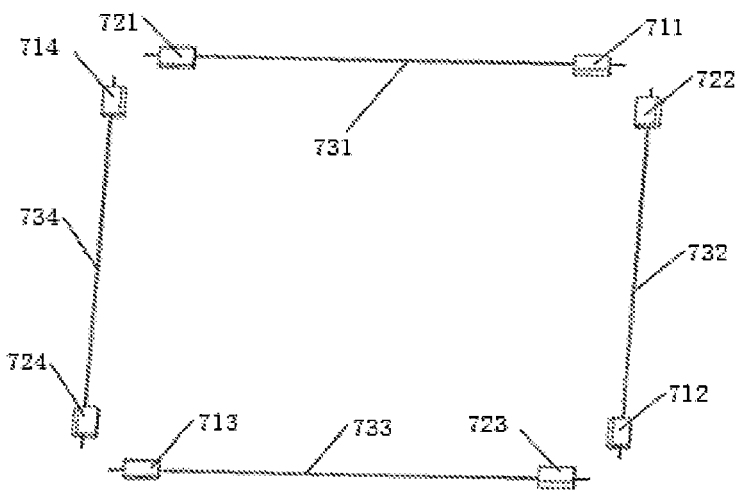
Figure 19:
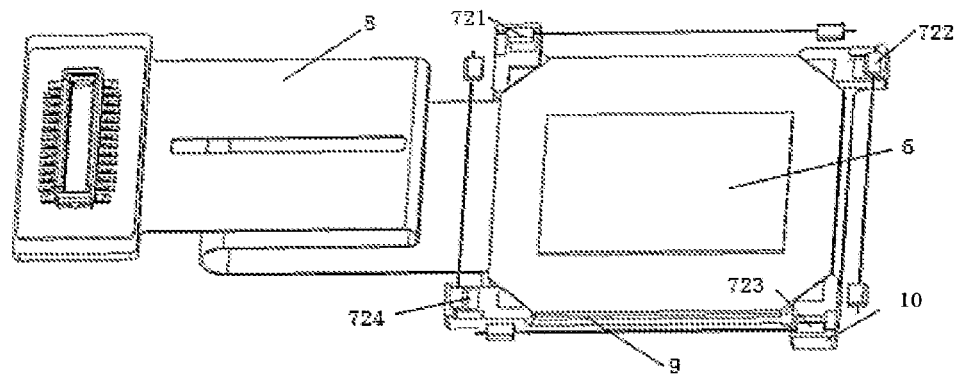
Figure 20:
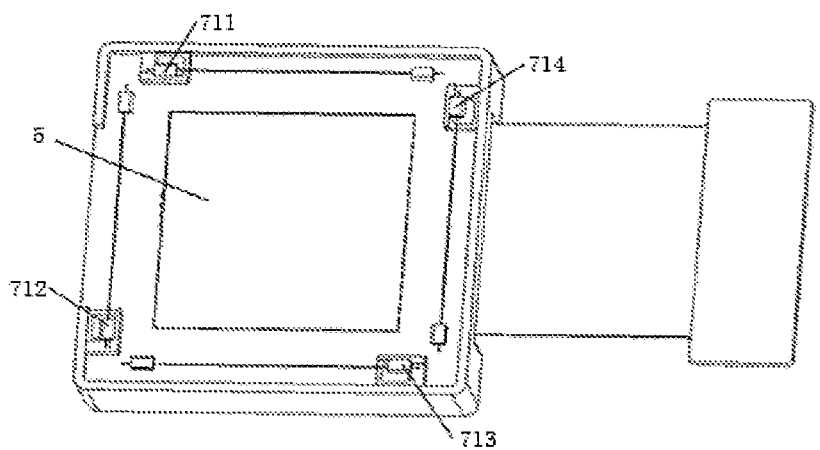

For example, the electro-deformation assembly includes two first deformation members and two second deformation members. As shown in FIG. 18, the electro-deformation assembly 7 includes fixed blocks: a fixed block 711, a fixed block 712, a fixed block 713, a fixed block 714, a fixed block 721, a fixed block 722, a fixed block 723, and a fixed block 724. The electro-deformation assembly 7 includes a first deformation member 731, a second deformation member 732, a first deformation member 733, and a second deformation member 734; for example, the first deformation member and the second deformation member are shape memory alloy members, and because the shape memory alloy members have shape memory effects, after being energized, the shape memory alloy members may generate heat, the temperature may change, and the shape of the metal may change; the magnitude of the current in the shape memory alloy member is controlled, so that the first deformation member 731 and the first deformation member 733 are deformed, and the first deformation member 731 and the first deformation member 733 serve as a driving force for moving the entire photographing apparatus in the first direction; the magnitude of the current is controlled, so that the second deformation member 732 and the second deformation member 734 are deformed, and the second deformation member 732 and the second deformation member 734 serve as a driving force for moving the entire photographing apparatus in the second direction; and the first deformation member 731, the first deformation member 733, the second deformation member 732, and the second deformation member 734 drive the first substrate 8 and the photosensitive chip 6 to move within the first plane, thereby realizing anti-shake.

According to some embodiments of the present application, the photographing apparatus further includes: an elastic member 11, where the elastic member 11 is separately connected to the base 12 and the first substrate, and the elastic member 11 drives the first substrate to be at an original position.

It can be understood that in a case that the first substrate 8 is displaced, the elastic member 11 drives the first substrate 8 to return to the position before the displacement, that is, the elastic member 11 drives the first substrate 8 to return to the original position. The elastic member 11 is used to suspend the first substrate 8 relative to the base 12, so as to allow the first substrate 8 to move.

It should be noted that the original position refers to a preset position of the first substrate 8 in a free state, that is, in a case that the first substrate 8 is in the preset position, the driving module does not operate, and the elastic member 11 is in the free state.

During an anti-shake movement of the photographing apparatus, the elastic member 11 may give a reverse pulling force. In a case that the electro-deformation assembly is powered off or does not deform, the elastic member 11 may drive the photosensitive chip 6 to return to the original position quickly.

Optionally, the elastic member 11 may be connected to the base 12 and the first substrate 8 by means of heat riveting, bonding, or the like.

According to some embodiments of the present application, the elastic member 11 includes a first fixing portion, a second fixing portion, and an elastic connecting arm, where the first fixing portion is mounted on the base 12, and the first fixing portion is fixed relative to the base 12; the second fixing portion is mounted on the first substrate 8, and the second fixing portion is fixed relative to the first substrate 8, where one of the first fixing portion and the second fixing portion is in a hollow structure, and the other is located in the hollow structure; the elastic connecting arm is located between the first fixing portion and the second fixing portion, and the elastic connecting arm is separately connected to the first fixing portion and the second fixing portion, and the elastic connecting arm is deformable.

It can be understood that, one of the first fixing portion and the second fixing portion is in a hollow structure, which may facilitate the other one being located in the hollow structure, thereby facilitating the elastic member 11 of moving, that is, facilitating the elastic connecting arm of moving.

Optionally, the first fixing portion is in a hollow structure, and the second fixing portion is located in the hollow structure.

Alternatively, the second fixing portion is in a hollow structure, and the first fixing portion is located in the hollow structure.

Optionally, there are a plurality of elastic connecting arms, and the plurality of elastic connecting arms are arranged at intervals along a circumferential direction of the first substrate 8. It can be understood that "the plurality of" refers to two or more. Optionally, the plurality of elastic connecting arms may be arranged at equal intervals, so as to have a uniform mass distribution and high stability. For example, in the example shown in the figure, there are four elastic connecting arms, and the four elastic connecting arms are respectively located around the first fixing portion. Definitely, other arrangement methods are also within the protection scope of the present application.

Figure 21:
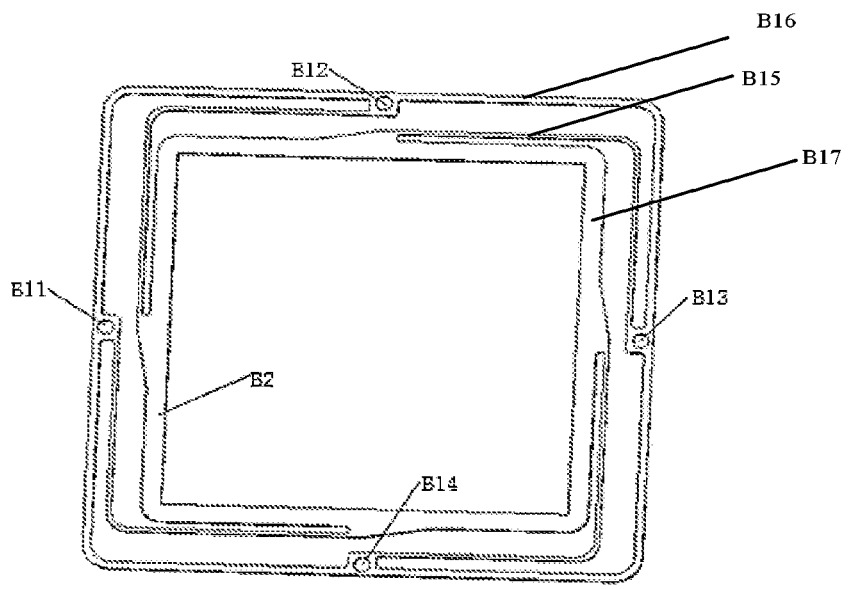

For example, as shown in FIG. 21, the elastic member 11 includes a first fixing portion B16, a second fixing portion B17, and an elastic connecting arm B15.

According to some embodiments of the present application, the elastic member 11 has a first mounting portion, and the base 12 includes: a baseboard and a side wall, where the baseboard is provided with a second mounting portion, and the second mounting portion is adapted to the first mounting portion; and the side wall is arranged around the baseboard, and the side wall is connected to an edge of the baseboard, the lens module is mounted on the side wall, the lens module, the baseboard, and the side wall together form an installation cavity, and the elastic member 11, the photosensitive chip module, and the driving module are all located in the installation cavity.

It can be seen from the above that the elastic member 11 has a first mounting portion, the baseboard is provided with a second mounting portion, and the second mounting portion is adapted to the first mounting portion, so that the elastic member 11 is connected to the base 12 through the first mounting portion and the second mounting portion. The lens module, the baseboard, and the side wall together form an installation cavity, and the elastic member 11, the photosensitive chip module, and the driving module are all located in the installation cavity. The elastic member 11, the photosensitive chip module, and the driving module may move in the installation cavity with high stability and reliability.

Optionally, one of the first mounting portion and the second mounting portion is a mounting hole, and the other is a mounting column adapted to the mounting hole.

Optionally, the first mounting portion is a mounting hole, and the second mounting portion is a mounting column.

Optionally, the first mounting portion is a mounting column, and the second mounting portion is a mounting hole.

Optionally, there are a plurality of mounting holes and mounting columns in one-to-one correspondence, and "the plurality of" may refer to two or more. The elastic member 11 and the base 12 may be fixedly connected by fitting the mounting holes with the mounting columns. When there are a plurality of mounting holes and mounting columns, the fixation between the elastic member 11 and the base 12 may be increased, thereby improving the stability of the photographing apparatus.

Figure 22:
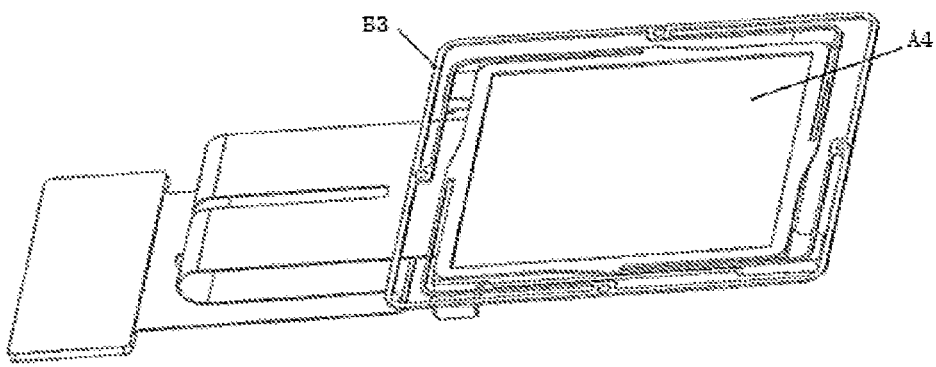

For example, as shown in FIG. 21 and FIG. 22, the elastic member 11 includes a metal ring B2, and the bracket 10 includes a bottom surface A4. The metal ring B2 is connected and fixed with the bottom surface A4 by using the glue, so that one end of the elastic member 11 is fixed on the bracket 10.

As shown in FIG. 21, FIG. 22, FIG. 23, and FIG. 24, for example, the elastic member 11 includes a fixing hole B11, a fixing hole B12, a fixing hole B13, and a fixing hole B14, the base 12 includes a fixing column C11, a fixing column C12, a fixing column C13, and a fixing column C14. The fixing hole B11 is corresponding to the fixing column C11, which are fixed by hot riveting or glue, the fixing hole B12 is corresponding to the fixing column C12, which are fixed by hot riveting or glue, the fixing hole B13 is corresponding to the fixing column C13, which are fixed by hot riveting or glue, and the fixing hole B14 is corresponding to the fixing column C14, which are fixed by hot riveting or glue. The elastic member 11 includes a metal ring B3, and the base 12 includes a bump C21, a bump C22, a bump C23, a bump C24, a bump C31, a bump C32, a bump C33, and a bump C34. The metal ring B3 is attached to a plane formed by the bump C21, the bump C22, the bump C23, the bump C24, the bump C31, the bump C32, the bump C33, and the bump C34. The glue may be added to the bump C21, the bump C22, the bump C23, the bump C24, the bump C31, the bump C32, the bump C33, and the bump C34 to increase the fixing strength of elastic member 11. Through the above methods, one end of the elastic member 11 is fixed on the bracket 10, and the other end of the elastic member 11 is fixed to the base 12, so that the bracket 10, the first substrate 8, the photosensitive chip 6, and the like can be suspended by using the elastic member 11.

Figure 7:
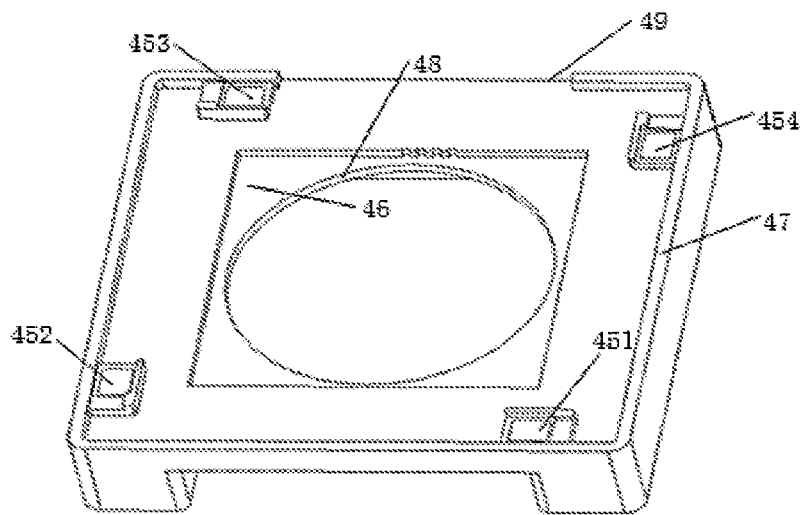
Figure 8:
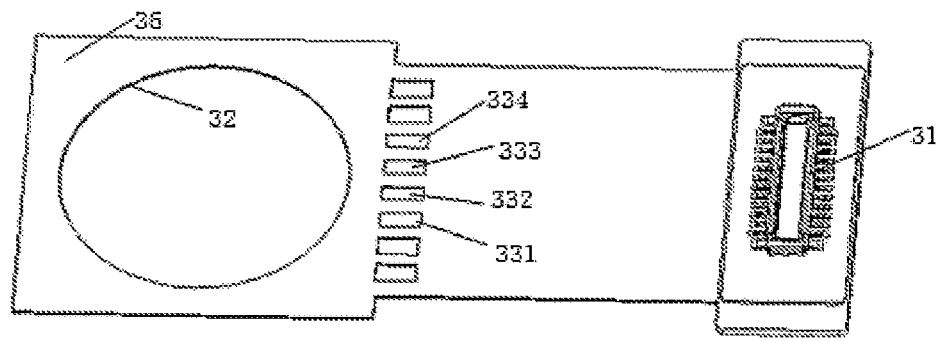
Figure 9:
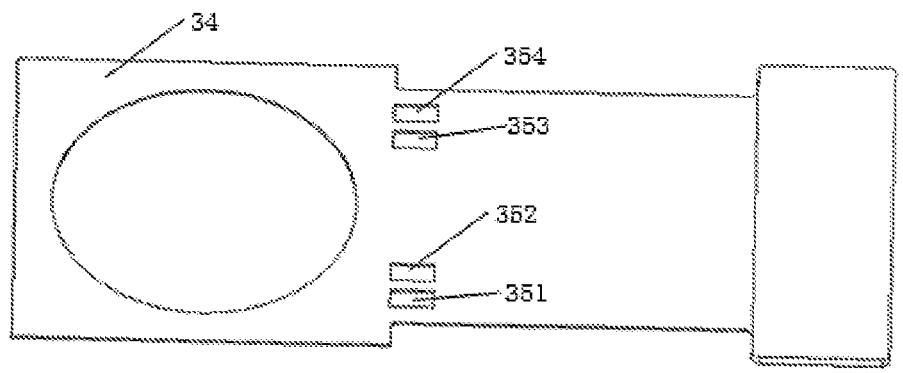
Figure 10:
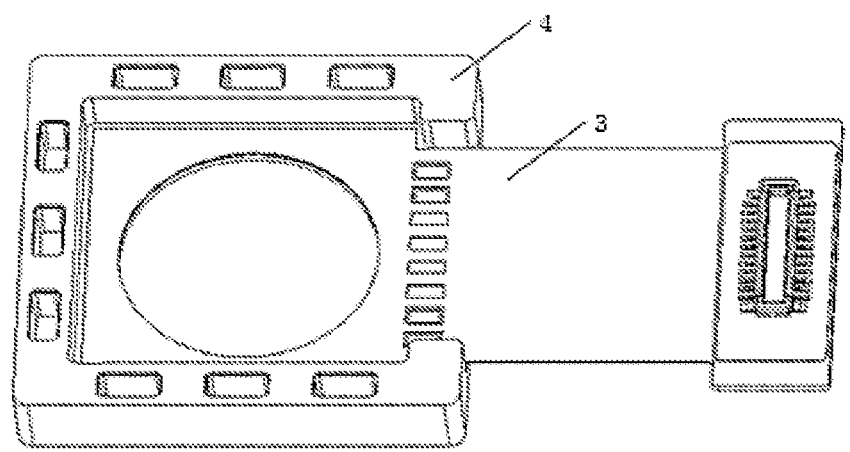
Figure 11:
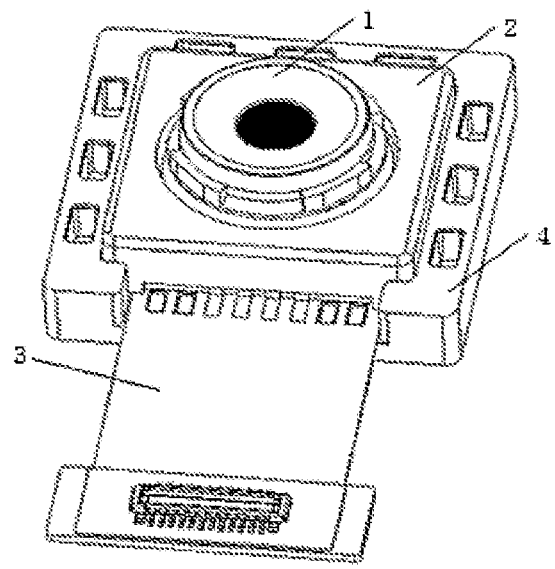
Figure 23:
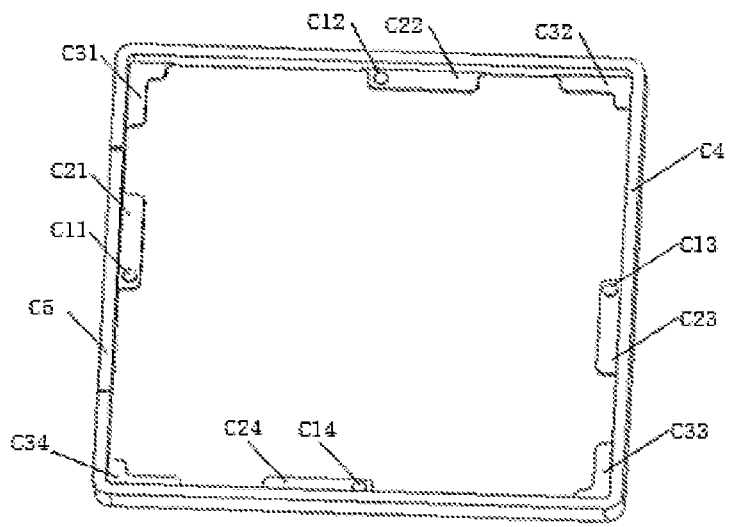
Figure 24:
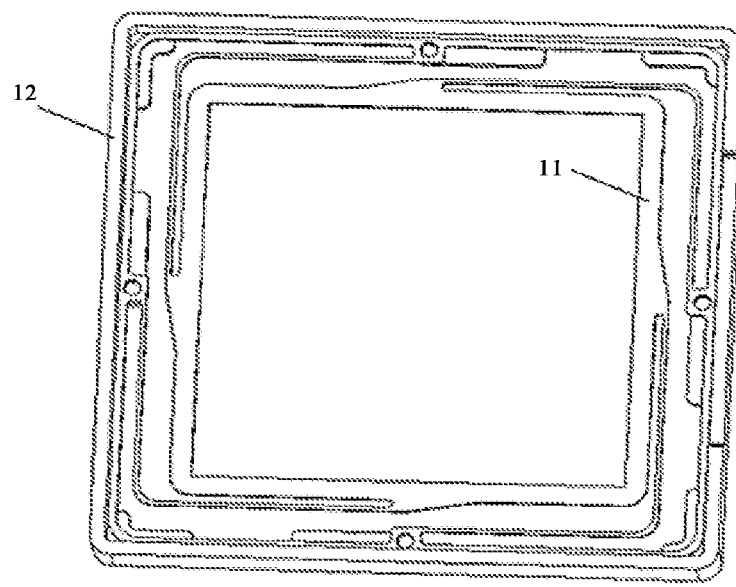
Figure 25:
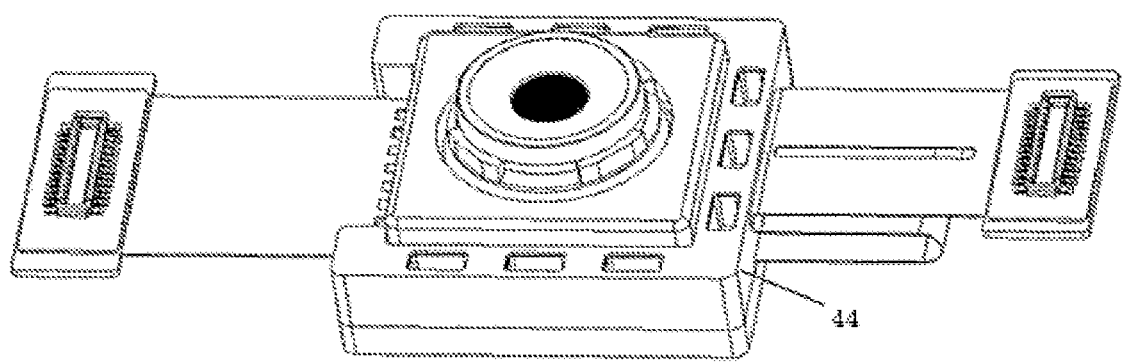
Figure 26:
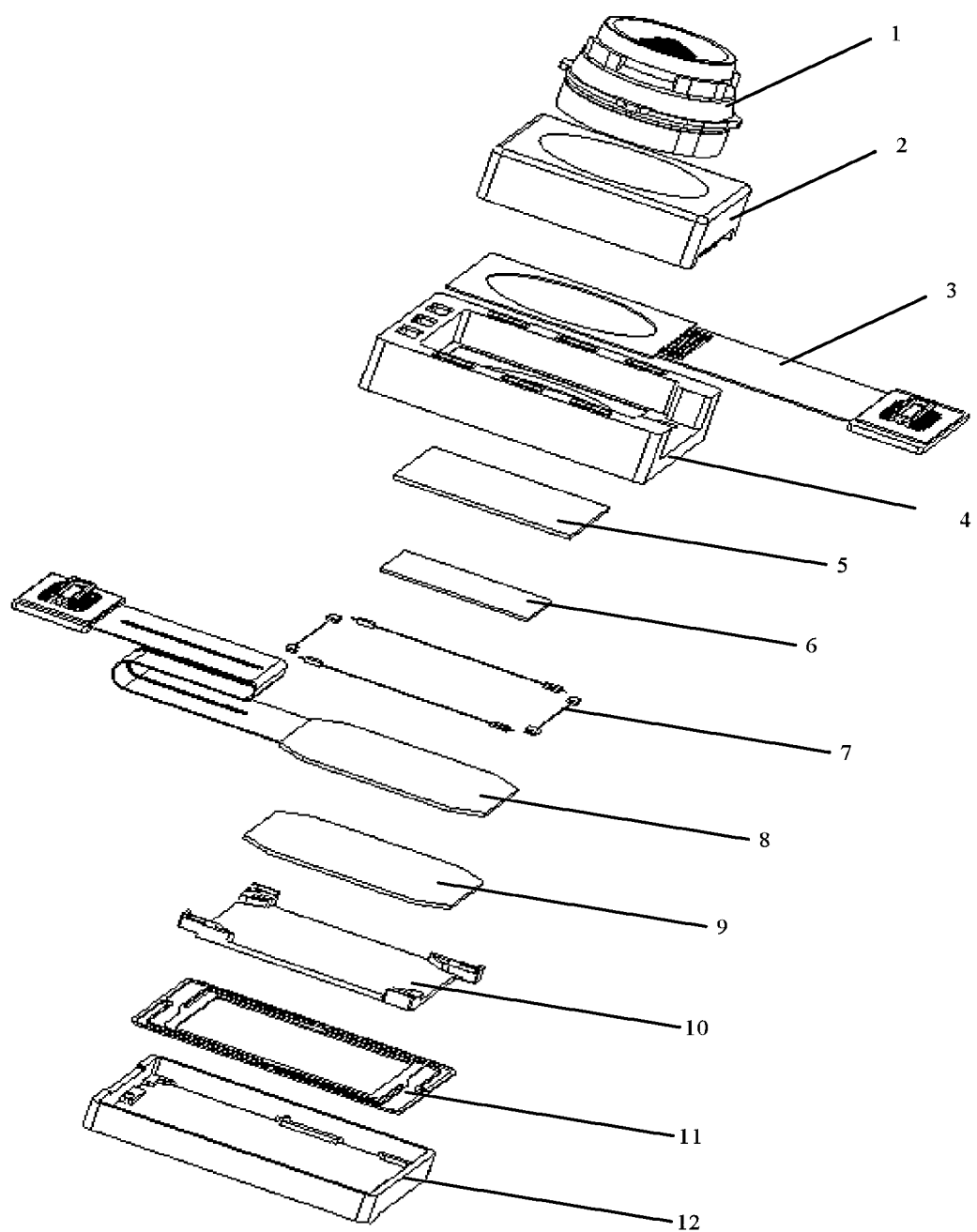
FIG. 26 is a schematic exploded diagram of a photographing apparatus according to an embodiment of the present application.

As shown in FIG. 7, FIG. 23, and FIG. 25, the base 12 includes a baseboard C4, the frame 4 includes a side wall 47, the baseboard C4 and the side wall 47 are fixed by using the glue, so that the base 12 and the frame 4 are bonded and fixed, and therefore, the movable apparatus is surrounded and protected; the base 12 includes a groove C5, the frame 4 includes a groove 49, and a space formed by the groove C5 and the groove 49 facilitates that a movable portion 82 of the first substrate 8 may not be interfered during operation.

According to some embodiments of the present application, the lens module includes a frame 4, where the frame 4 is used to mount the lens body 1, and the electro-deformation assembly 7 is separately connected to the frame 4 and the first substrate 8.

Optionally, the frame 4 is an injection-molded plastic part, which is used to carry the lens body 1, and forms an installation cavity with the base 12. The photosensitive chip module, the driving module, and the elastic member 11 are arranged in the installation cavity for encircling and protection, thereby preventing the photographing apparatus from being disturbed by the outside world.

As shown in FIG. 3, FIG. 4, FIG. 5, FIG. 6, and FIG. 7, the frame 4 includes a conductive part 4A and an injection molded part 4B, and the conductive part 4A and the injection molded part 4B are insert-molded by using the insert molding technology. Optionally, the conductive part 4A may be a metal piece. This is not specifically limited in this embodiment of the present application. The conductive part 4A includes a metal surface 4A1, a metal surface 4A2, a metal surface 4A3, a metal surface 4A4, a metal surface 4A5, a metal surface 4A6, a metal surface 4A7, and a metal surface 4A8, and the injection molded part 4B includes a groove 4B1, a groove 4B2, a groove 4B3, a groove 4B4, a groove 4B5, a groove 4B6, a groove 4B7, and a groove 4B8. The metal surface 4A1 and the groove 4B1 form a welding area 411, the metal surface 4A2 and the groove 4B2 form a welding area 412, the metal surface 4A3 and the groove 4B3 form a welding area 413, the metal surface 4A4 and the groove 4B4 form a welding area 414, the metal surface 4A5 and the groove 4B5 form a welding area 451, the metal surface 4A6 and the groove 4B6 form a welding area 452, the metal surface 4A7 and the groove 4B7 form a welding area 453, and the metal surface 4A8 and groove 4B8 form a welding area 454.

Figure 6:
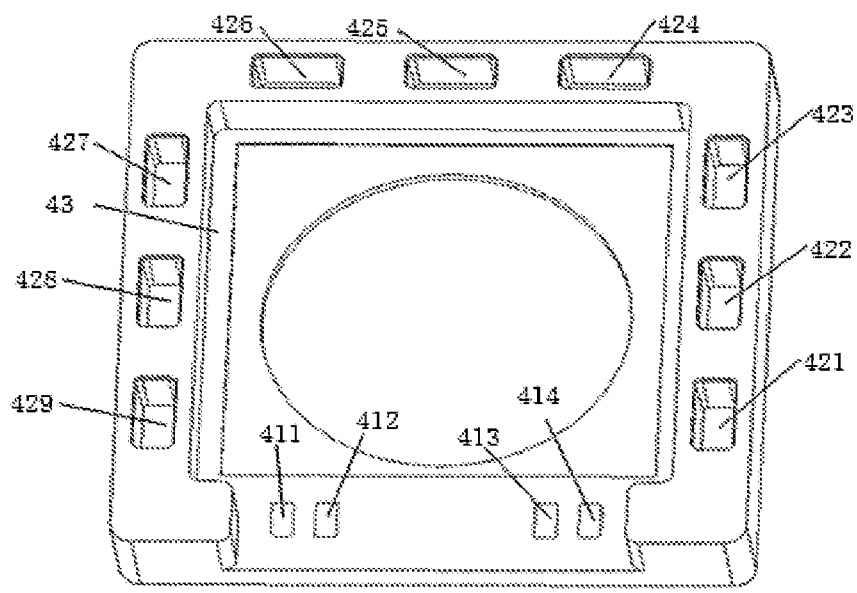

As shown in FIG. 6, the frame 4 includes a groove 421, a groove 422, a groove 423, a groove 424, a groove 425, a groove 426, a groove 427, a groove 428, and a groove 429 with the purpose of reducing the overall weight of the frame 4 and reducing the overall deformation rate of the frame 4.

Optionally, the photographing apparatus further includes a filter 5, and the filter 5 performs filtering processing on the light transmitted by the lens body 1, so that the photosensitive chip 6 can have a better imaging effect.

Optionally, the photographing apparatus further includes a heating panel 9, and the heating panel 9 is disposed on the first substrate 8, for example, at the bottom of the photosensitive chip 6. When the photosensitive chip 6 operates, a large amount of heat may be generated, and the heating panel 9 may quickly export and dissipate the heat generated by the photosensitive chip 6 into the air, so as to reduce the influence of the heat on the imaging effect of the apparatus. In addition, the photosensitive chip 6 may be protected from being impacted. Optionally, the heating panel 9 may be a metal piece.

Figure 12:
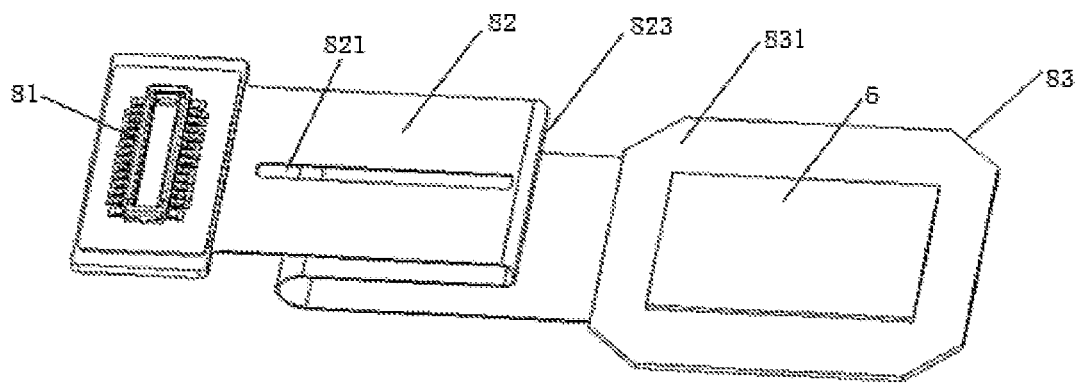
Figure 13:
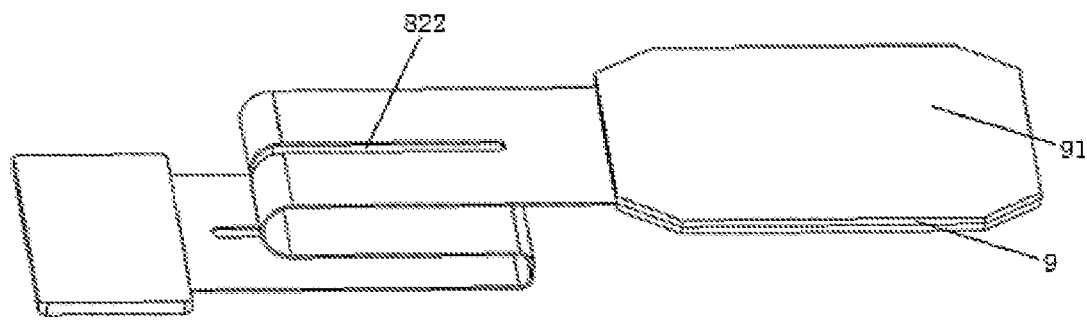
Figure 14:
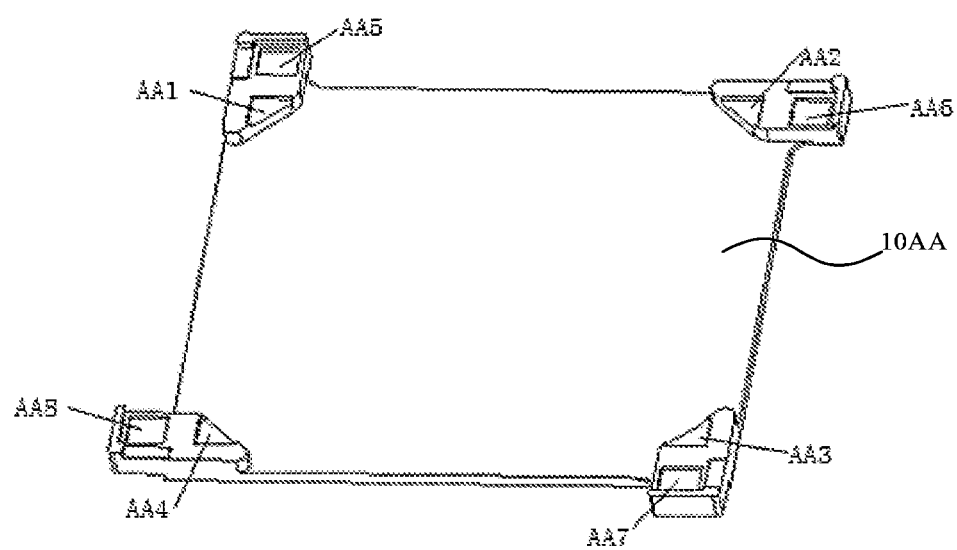
Figure 15:
Figure 15:
Figure 16:
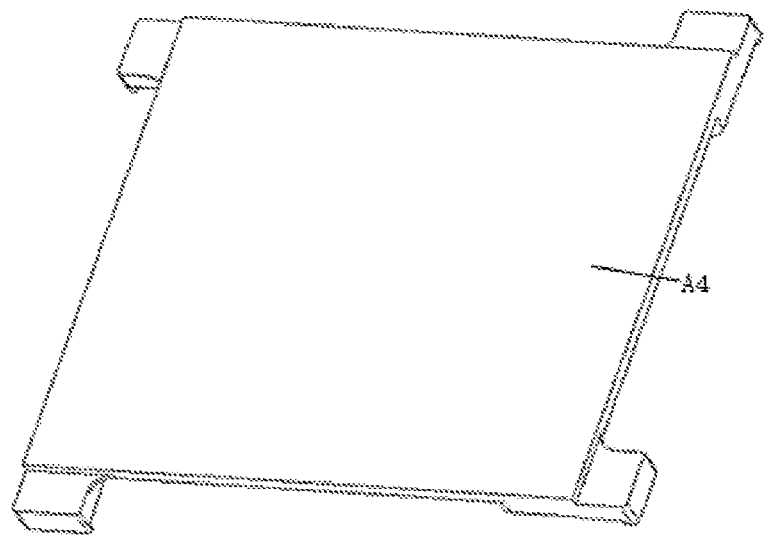
Figure 17:
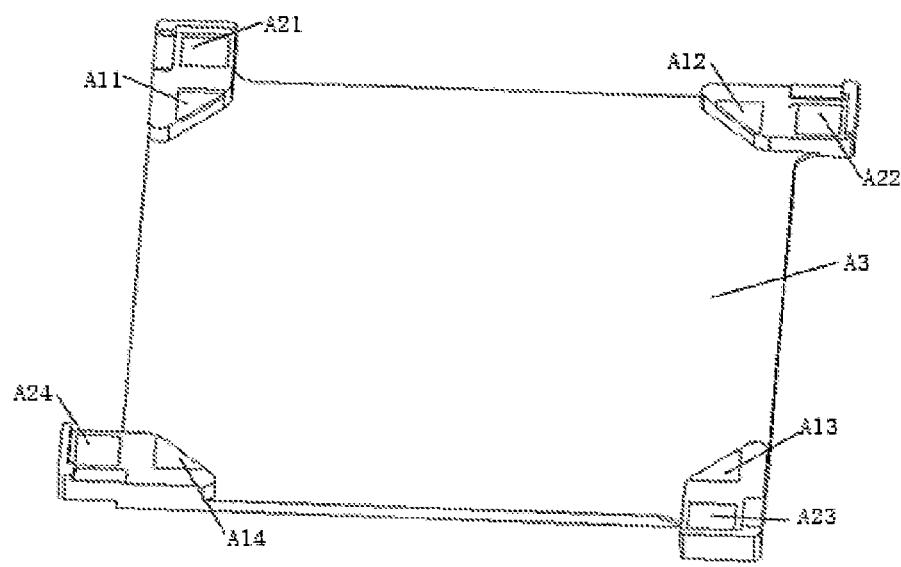

As shown in FIG. 12, FIG. 13, and FIG. 25, the first substrate 8 includes a fixing plate 83, the fixing plate 83 is a multi-layer flexible circuit substrate, and the photosensitive chip 6 may be attached on a plane 831 of the fixing plate 83 by using the surface mounted technology (Surface Mounted Technology, SMT), so that the photosensitive chip 6 is fixed on the first substrate 8. The module steel plate 9 is fixed on the fixing plate 83 through bonding. The first substrate 8 includes a movable portion 82, and the movable portion 82 is a 2-layer (not limited to 2-layer) S-shaped bending flexible circuit substrate. The middle part of the movable portion 82 includes a through hole 821 and a through hole 822 to reduce the anti-torque generated by the movable portion 82 during operation. The movable portion 82 includes a side surface 823, the frame 4 includes a side surface 44, and the side surface 823 and the side surface 44 are bonded and fixed together by using the glue, so as to control a movable range of the movable portion 82. The first substrate 8 includes a connector 81, and the connector 81 is buckled and connected to an external connector of the entire machine, so as to realize the power-on function of the apparatus partially.

As shown in FIG. 5, FIG. 13, FIG. 17, FIG. 18, FIG. 19, and FIG. 20, the module steel plate 9 includes an adhesive surface 91, the bracket 10 includes an adhesive surface A3, and the adhesive surface 91 and the adhesive surface A3 are bonded and fixed together by using the glue, so that the photosensitive chip 6, the first substrate 8, the module steel plate 9, and the bracket 10 are fixed together. The fixing block 721 included in the electro-deformation assembly 7 is corresponding to the welding area A21 included in the bracket 10, which are fixed and connected by welding. The fixing block 722 included in the electro-deformation assembly 7 is corresponding to the welding area A22 included in the bracket 10, which are fixed and connected by welding. The fixing block 723 included in the electro-deformation assembly 7 is corresponding to the welding area A23 included in the bracket 10, which are fixed and connected by welding. The fixing block 724 included in the electro-deformation assembly 7 is corresponding to the welding area A24 included in the bracket 10, which are fixed and connected by welding. The fixing block 711 included in the electro-deformation assembly 7 is corresponding to the welding area 454 included in the bracket 10, which are fixed and connected by welding. The fixing block 712 included in the electro-deformation assembly 7 is corresponding to the welding area 451 included in the bracket 10, which are fixed and connected by welding. The fixing block 713 included in the electro-deformation assembly 7 is corresponding to the welding area 452 included in the bracket 10, which are fixed and connected by welding. The fixing block 714 included in the electro-deformation assembly 7 is corresponding to the welding area 453 included in the bracket 10, which are fixed and connected by welding. In the foregoing methods, two ends of the electro-deformation assembly 7 are fixed to the bracket 10 and the bracket 10 respectively, and the two ends are connected to the first substrate 8 and the focusing substrate 3 respectively for conduction. In this way, the energizing circuit of the entire photographing apparatus is turned on.

Optionally, the lens module may include a focusing substrate 3 and a motor 2. Thus, focusing can be achieved. The lens body 1 is an optical component including one or more cambered optical glass or plastic parts, which can receive optical signals and gather the optical signals on the surface of the photosensitive chip 6. The lens body is an indispensable optical element in the camera and directly affects the imaging quality and the realization and effect of the algorithm. The motor 2 is a driving structure assembled by a plurality of components, which may drive the lens body 1 to move, so as to realize the automatic focusing of the photographing apparatus. The motor 2 and the lens body 1 may be fixed by using the glue, and are used as an auto focus driving part of the entire anti-shake apparatus; this solution is described by taking a closed-loop motor 2 as an example, but the embodiments of the present application are not limited to the closed-loop drive motor, but also include an open loop motor and a mid-mounted motor. The focusing substrate 3 is a flexible circuit substrate, which is connected to the motor 2 and provides an electrical connection relationship for the motor 2, so that the motor 2 is connected to an external connector, so as to realize the conduction between the automatic focusing part of the photographing apparatus and the outside world, and realize the automatic focusing function.

Optionally, the lens body 1 may be connected to the motor 2 by using the glue.

As shown in FIG. 2, FIG. 6, FIG. 8, FIG. 9, FIG. 10, and FIG. 11, the focusing substrate 3 is fixedly connected to the bonding surface 43 of the frame 4 through the bonding surface 34, and the focusing substrate 3 is bonded to the motor 2 through the bonding surface 36, so that the automatic focusing part of the entire photographing apparatus is fixed with the frame 4. The focusing substrate 3 includes welding holes, which are respectively a welding hole 351, a welding hole 352, a welding hole 353, and a welding hole 354. The welding hole 351 is corresponding to the welding area 411, which are connected for conduction by welding or the like. The welding hole 352 is corresponding to the welding area 412, which are connected for conduction by welding or the like. The welding hole 353 is corresponding to the welding area 413, which are connected for conduction by welding or the like. The welding hole 354 is corresponding to the welding area 414, which are connected for conduction by welding or the like. The focusing substrate 3 includes welding areas, which are respectively a welding area 331, a welding area 332, a welding area 333, and a welding area 334, and the motor 2 includes welding terminals, which are a welding terminal 21, a welding terminal 22, a welding terminal 23, and a welding terminal 24 respectively. The welding area 331 is corresponding to the welding terminal 21, which are connected for conduction by welding or the like. The welding area 332 is corresponding to the welding terminal 22, which are connected for conduction by welding or the like. The welding area 333 is corresponding to the welding terminal 23, which are connected for conduction by welding or the like. The welding area 334 is corresponding to the welding terminal 24, which are connected for conduction by welding or the like. The focusing substrate 3 includes a connector 31, and the connector 31 is buckled and connected to a connector of the entire machine, so as to realize the power-on function of the photographing apparatus partially.

Based on the photographing apparatus disclosed in the embodiments of the present application, an embodiment of the present application discloses an electronic device. The disclosed electronic device includes the above photographing apparatus.

Based on the electronic device disclosed in this embodiment of the present application, an embodiment of the present application further discloses a method for controlling a photographing apparatus. The disclosed method for controlling a photographing apparatus includes the following steps.

Step a: Receive an input of a user.

Optionally, the input of the user may be an input for triggering anti-shake, which includes but is not limited to a touch input and a voice input. For example, the input may be an input of the user to an anti-shake control in a photo preview interface.

Step b: Drive, by the driving module in response to the input, the photosensitive chip module to move within the first plane for anti-shake.

In the embodiments of the present application, based on the electronic device, by receiving the input of the user, in response to the input, the driving module drives the photosensitive chip module to move within the first plane parallel to the lens body, so as to realize anti-shake.

Based on the above method for controlling a photographing apparatus, an embodiment of the present application further provides an apparatus of the control method, including:

- a receiving module, configured to receive an input of a user; and
- a control module, configured to drive, by the driving module in response to the input, the photosensitive chip module to move within the first plane for anti-shake.

In the embodiments of the present application, the driving module drives the photosensitive chip module to move within the first plane parallel to the lens body, so as to realize anti-shake.

An embodiment of the present application further discloses an electronic device, including a processor, a memory, and a computer program stored in the memory and executable on the processor. When the computer program is executed by the processor, the steps of the control method in any one of the foregoing embodiments are implemented.

An embodiment of the present application further discloses a computer-readable storage medium. The computer-readable storage medium stores a computer program, where when the computer program is executed by a processor, the steps of the control method in any one of the foregoing embodiments are implemented.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on this understanding, the essence of the technical solutions of the present disclosure, the part contributing to the prior art, or some of the technical solutions may be represented in a form of software product. The computer software product is stored in a storage medium, and includes several instructions to enable a computer device (which may be a personal computer, a server, a network device, or the like) to perform all or some of the steps of the method described in various embodiments of the present disclosure. The foregoing storage medium includes any medium that can store program code, such as a USB flash drive, a removable hard disk, a ROM, a RAM, a magnetic disk, or an optical disc.

Those of ordinary skill in the art can understand that some or all processes of the realization of the foregoing method in the embodiments can be implemented by controlling relevant hardware by the computer program. The foregoing program may be stored in a computer-readable storage medium, where when the program is executed, the processes of the embodiments of the foregoing methods can be included. The foregoing storage medium may include: a magnetic disk, an optical disc, a read-only memory (Read-Only Memory, ROM), a random access memory (Random Access Memory, RAM), or the like.

The electronic device disclosed in this embodiment of the present application may be a smart phone, a tablet computer, an eBook reader, a wearable device (for example, a smart watch), a video game console, and the like. A specific type of the electronic device is not limited in this embodiment of the present application.

The embodiments of the present application focus on describing differences between the embodiments, and different optimization features of the embodiments may be combined to form better embodiments provided that they are not contradictory. Considering brevity, details are not described herein again.

The foregoing descriptions are merely embodiments of the present application, but are not intended to limit the present application. Various changes and modifications may be made to the present application by those skilled in the art. Any modifications, equivalent substitutions, improvements, and the like made within the spirit and principle of the present application should be included within the scope of the claims of the present application.

The invention claimed is:

1. A photographing apparatus, comprising:
   a base;
   a lens module, wherein the lens module is mounted on the base, the lens module is fixedly arranged relative to the base, and the lens module comprises a lens body;
   a photosensitive chip module, wherein the photosensitive chip module is mounted on the lens module, the photosensitive chip module is located on a side of the lens module that is close to the base, the photosensitive chip module is movable within a first plane, and the first plane is a plane parallel to the lens body; and
   a driving module, wherein the driving module is separately connected to the lens module and the photosensitive chip module, and the driving module drives the photosensitive chip module to move within the first plane;
   wherein the photosensitive chip module comprises:
   a first substrate;
   a photosensitive chip, wherein the photosensitive chip is mounted on the first substrate, the photosensitive chip faces the lens body, and the photosensitive chip is electrically connected to the first substrate, wherein
   the driving module is connected to the first substrate, the driving module is electrically connected to the first substrate, and the driving module drives the first substrate to move within the first plane to drive the photosensitive chip to move.

2. The photographing apparatus according to claim 1, wherein the driving module comprises:
   an electro-deformation assembly, wherein the electro-deformation assembly is separately connected to the lens module and the first substrate, the electro-deformation assembly is electrically connected to the first substrate, and in a case that the electro-deformation assembly is energized, the electro-deformable assembly can be deformed to drive the first substrate to move within the first plane, and the first substrate drives the photosensitive chip to move.

3. The photographing apparatus according to claim 2, wherein the driving module further comprises:
   a bracket, wherein the bracket is separately connected to the first substrate and the electro-deformation assembly, and the electro-deformation assembly is electrically connected to the first substrate through the bracket.

4. The photographing apparatus according to claim 2, wherein the electro-deformation assembly comprises:
   a first deformation member, wherein the first deformation member is separately connected to the first substrate and the lens module, the first deformation member extends along a first direction, and in a case that the first deformation member is energized, the first deformation member can be deformed to drive the first substrate to move in the first direction, and the first substrate drives the photosensitive chip to move.

5. The photographing apparatus according to claim 4, wherein the electro-deformation assembly comprises:
   a second deformation member, wherein the second deformation member is separately connected to the first substrate and the lens module, the second deformation member extends along a second direction, and in a case that the second deformation member is energized, the second deformation member can be deformed to drive the first substrate to move in the second direction, and the first substrate drives the photosensitive chip to move, wherein
   both the second direction and the first direction are within the first plane, and the second direction intersects the first direction.

6. The photographing apparatus according to claim 1, further comprising:
   an elastic member, wherein the elastic member is separately connected to the base and the first substrate, and the elastic member drives the first substrate to be at an original position.

7. The photographing apparatus according to claim 6, wherein the elastic member comprises:
   a first fixing portion, wherein the first fixing portion is mounted on the base, and the first fixing portion is fixed relative to the base;
   a second fixing portion, wherein the second fixing portion is mounted on the first substrate, and the second fixing portion is fixed relative to the first substrate, wherein one of the first fixing portion and the second fixing portion is in a hollow structure, and the other is located in the hollow structure; and
   an elastic connecting arm, wherein the elastic connecting arm is located between the first fixing portion and the second fixing portion, and the elastic connecting arm is separately connected to the first fixing portion and the second fixing portion, and the elastic connecting arm is deformable.

8. The photographing apparatus according to claim 7, wherein there are a plurality of elastic connecting arms, and the plurality of elastic connecting arms are arranged at intervals along a circumferential direction of the first substrate.

9. The photographing apparatus according to claim 6, wherein the elastic member has a first mounting portion, and the base comprises:
- a baseboard, wherein the baseboard is provided with a second mounting portion, and the second mounting portion is adapted to the first mounting portion; and
- a side wall, wherein the side wall is arranged around the baseboard, and the side wall is connected to an edge of the baseboard, the lens module is mounted on the side wall, the lens module, the baseboard, and the side wall together form an installation cavity, and the elastic member, the photosensitive chip module, and the driving module are all located in the installation cavity.

10. The photographing apparatus according to claim 9, wherein one of the first mounting portion and the second mounting portion is a mounting hole, and the other is a mounting column adapted to the mounting hole.

11. The photographing apparatus according to claim 2, wherein the lens module comprises a frame, wherein the frame is used to mount the lens body, and the electro-deformation assembly is separately connected to the frame and the first substrate.

12. An electronic device, comprising a photographing apparatus; wherein the photographing apparatus comprises:
- a base;
- a lens module, wherein the lens module is mounted on the base, the lens module is fixedly arranged relative to the base, and the lens module comprises a lens body;
- a photosensitive chip module, wherein the photosensitive chip module is mounted on the lens module, the photosensitive chip module is located on a side of the lens module that is close to the base, the photosensitive chip module is movable within a first plane, and the first plane is a plane parallel to the lens body; and
- a driving module, wherein the driving module is separately connected to the lens module and the photosensitive chip module, and the driving module drives the photosensitive chip module to move within the first plane;
- wherein the photosensitive chip module comprises:
- a first substrate;
- a photosensitive chip, wherein the photosensitive chip is mounted on the first substrate, the photosensitive chip faces the lens body, and the photosensitive chip is electrically connected to the first substrate, wherein
- the driving module is connected to the first substrate, the driving module is electrically connected to the first substrate, and the driving module drives the first substrate to move within the first plane to drive the photosensitive chip to move.

13. The electronic device according to claim 12, wherein the driving module comprises:
- an electro-deformation assembly, wherein the electro-deformation assembly is separately connected to the lens module and the first substrate, the electro-deformation assembly is electrically connected to the first substrate, and in a case that the electro-deformation assembly is energized, the electro-deformable assembly can be deformed to drive the first substrate to move within the first plane, and the first substrate drives the photosensitive chip to move.

14. The electronic device according to claim 13, wherein the driving module further comprises:
- a bracket, wherein the bracket is separately connected to the first substrate and the electro-deformation assembly, and the electro-deformation assembly is electrically connected to the first substrate through the bracket.

15. The electronic device according to claim 13, wherein the electro-deformation assembly comprises:
- a first deformation member, wherein the first deformation member is separately connected to the first substrate and the lens module, the first deformation member extends along a first direction, and in a case that the first deformation member is energized, the first deformation member can be deformed to drive the first substrate to move in the first direction, and the first substrate drives the photosensitive chip to move.

16. The electronic device according to claim 15, wherein the electro-deformation assembly comprises:
- a second deformation member, wherein the second deformation member is separately connected to the first substrate and the lens module, the second deformation member extends along a second direction, and in a case that the second deformation member is energized, the second deformation member can be deformed to drive the first substrate to move in the second direction, and the first substrate drives the photosensitive chip to move, wherein
- both the second direction and the first direction are within the first plane, and the second direction intersects the first direction.

17. The electronic device according to claim 12, further comprising:
- an elastic member, wherein the elastic member is separately connected to the base and the first substrate, and the elastic member drives the first substrate to be at an original position.

18. A method for controlling a photographing apparatus, wherein the method is applied to a photographing apparatus, and the method comprises:
- receiving an input of a user; and
- driving, by the driving module in response to the input, the photosensitive chip module to move within a first plane for anti-shake;
- wherein the photographing apparatus comprises:
- a base;
- a lens module, wherein the lens module is mounted on the base, the lens module is fixedly arranged relative to the base, and the lens module comprises a lens body;
- a photosensitive chip module, wherein the photosensitive chip module is mounted on the lens module, the photosensitive chip module is located on a side of the lens module that is close to the base, the photosensitive chip module is movable within a first plane, and the first plane is a plane parallel to the lens body; and
- a driving module, wherein the driving module is separately connected to the lens module and the photosensitive chip module, and the driving module drives the photosensitive chip module to move within the first plane;
- wherein the photosensitive chip module comprises:
- a first substrate;
- a photosensitive chip, wherein the photosensitive chip is mounted on the first substrate, the photosensitive chip faces the lens body, and the photosensitive chip is electrically connected to the first substrate, wherein
- the driving module is connected to the first substrate, the driving module is electrically connected to the first substrate, and the driving module drives the first substrate to move within the first plane to drive the photosensitive chip to move.

* * * * *